(12) United States Patent
McKnight et al.

(10) Patent No.: US 10,273,369 B2
(45) Date of Patent: Apr. 30, 2019

(54) USE OF BENZOXAZINE AS A STRUCTURAL THERMAL PROTECTIVE SYSTEM (TPS) AND HEAT SHIELD MATERIAL

(71) Applicant: Raytheon Company, Waltham, MA (US)

(72) Inventors: Richard W. McKnight, Tucson, AZ (US); Gray E. Fowler, Allen, TX (US)

(73) Assignee: RAYTHEON COMPANY, Waltham, MA (US)

(*) Notice: Subject to any disclaimer, the term of this patent is extended or adjusted under 35 U.S.C. 154(b) by 206 days.

(21) Appl. No.: 14/960,838

(22) Filed: Dec. 7, 2015

(65) Prior Publication Data

US 2017/0158877 A1    Jun. 8, 2017

(51) Int. Cl.
*C09D 5/18* (2006.01)
*C09D 179/00* (2006.01)
*C09D 179/04* (2006.01)

(52) U.S. Cl.
CPC ............. *C09D 5/18* (2013.01); *C09D 179/00* (2013.01); *C09D 179/04* (2013.01)

(58) Field of Classification Search
None
See application file for complete search history.

(56) References Cited

U.S. PATENT DOCUMENTS

| | | |
|---|---|---|
| 4,925,134 A | 5/1990 | Keller et al. |
| 5,772,154 A | 6/1998 | Stewart |
| 2002/0182058 A1* | 12/2002 | Darnell ................. F01D 9/065 415/115 |
| 2013/0345352 A1* | 12/2013 | Ward ................. C08G 73/0233 524/413 |
| 2015/0204274 A1 | 7/2015 | Fowler |
| 2015/0376447 A1* | 12/2015 | Kawabe ............... C08G 63/605 428/418 |
| 2017/0166528 A1* | 6/2017 | Peters .................. C07D 209/46 |
| 2017/0182700 A1* | 6/2017 | Brady .................... B29C 47/12 |

* cited by examiner

*Primary Examiner* — David Sample
*Assistant Examiner* — Nicole T Gugliotta
(74) *Attorney, Agent, or Firm* — Cantor Colburn LLP

(57) ABSTRACT

A heat shield includes a substrate having a surface; and a benzoxazine composite material disposed onto the surface of the substrate, the benzoxazine composite material comprising a benzoxazine compound and a reinforcing fiber.

14 Claims, 2 Drawing Sheets

USE OF BENZOXAZINE AS A STRUCTURAL THERMAL PROTECTIVE SYSTEM (TPS) AND HEAT SHIELD MATERIAL

BACKGROUND

The present disclosure relates to heat shields, and more specifically, to heat shield materials.

A TPS is a barrier that protects a spacecraft from a variety of conditions. For example, a TPS may protect a spacecraft from searing heat experienced during atmospheric reentry. During orbit in space, a TPS also protects the spacecraft from large temperature variations (e.g., hot and cold). A variety of methods and devices are used for TPSs. For example, a TPS may use ablative heat shields and/or active and passible surface cooling devices.

An ablative heat shield functions as a TPS by lifting the hot shock layer gas away from the heat shield's exterior surface, which creates a cooler boundary layer. The heat shield repels gaseous reaction products away from its surface, which protects from heat flux. Establishing a boundary layer to reduce heat flux is called blockage.

A heat shield may be ablative in two respects. The outer surface of the heat shield material may char, melt, and sublime. The bulk material then may undergo pyrolysis and expel product gases. The expelled gas is driven away from the surface, and therefore, blocks heat flux, including convective heat flux, radiative heat flux, and catalytic heat flux.

SUMMARY

According to one embodiment, a heat shield includes a substrate having a surface; and a benzoxazine composite material disposed onto the surface of the substrate, the benzoxazine composite material comprising a benzoxazine compound and a reinforcing fiber.

According to another embodiment, a heat shield includes a surface comprising a benzoxazine composite material; wherein the benzoxazine composite material comprises a benzoxazine resin and a reinforcing fiber, the reinforcing fiber being present in an amount in a range from about 48 to about 62 volume % (vol. %) based on total volume of the benzoxazine composite material.

Yet, according to another embodiment, a method of making a heat shield includes combining a reinforcing fiber and a benzoxazine resin in a mold; and curing the reinforcing fiber and the benzoxazine resin in the mold to form a molded heat shield; or curing the reinforcing fiber and the benzoxazine resin to form a heat shield layer and disposing the heat shield layer onto a substrate.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
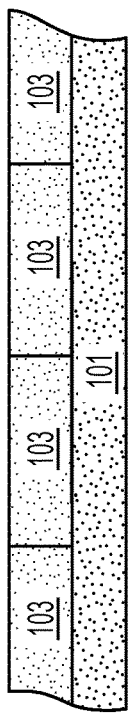
FIG. 1A is a cross-sectional side view of a portion of a heat shield including a benzoxazine composite material layer disposed onto a substrate.

Thermal shielding may be challenging in weapons systems. Phenolic polymers have been used in shielding materials due to their low cost, availability, and performance. Although phenolic polymers have desirable burn-heat properties, they may be difficult to process. Phenolic polymers also need to be cured at high pressures. Heat shield designs including phenolic polymers also may have poor laminate consolidation, poor fiber directional control, and condensation cure voids.

Accordingly, various embodiments described herein provide heat shields that include a benzoxazine composite material. The benzoxazine composite material is used to make a TPS. The TPS may be used, for example, as an ablative heat shield for space reentry vehicles, structural fire resistant bulkheads, non-corrosive air ducts for submarines, and other ship based applications. The benzoxazine composite materials also may be used to provide a TPS for hypersonic vehicles.

The heat shields provide high temperature resistance at a lower cost than phenolic based compounds. Further, unlike phenolic compounds, benzoxazine composite materials do not need to cure at high pressure and are relatively simple to process. Thus, the benzoxazine composite materials can be used in more diverse and complex applications. Compared to phenolic compounds, higher fiber volumes also can be used in the benzoxazine composites, which results in improved heat shield performance.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

It will also be understood that when an element, such as a layer, region, or substrate is referred to as being "on" or "over" another element, it can be directly on the other element or intervening elements may also be present. In contrast, when an element is referred to as being "directly on" or "directly over" another element, there are no intervening elements present.

Turning now to the Figures, FIG. 1A is a cross-sectional side view of a portion of a heat shield 100 including a benzoxazine composite material layer 102 disposed onto a substrate 101 according to an embodiment. In one embodiment, the benzoxazine composite material layer 102 includes a benzoxazine compound and reinforcing fibers. The benzoxazine compound may be a monomer including a benzoxazine compound, a polymer including a benzoxazine compound, a resin including a benzoxazine compound, a crosslinked compound comprising a benzoxazine compound, or a combination thereof.

In some embodiments, the benzoxazine compound (4) may be formed by, for example, reacting a phenol (1), formaldehyde (2) (or paraformaldehyde), and a primary amine (3) as shown in the Reaction Scheme 1:

Reaction Scheme 1

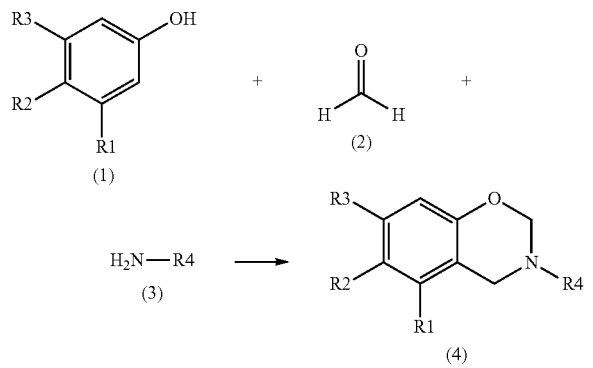

Reaction Scheme 1 illustrates an exemplary method of making a monomeric benzoxazine compound. In Reaction Scheme 1, R1, R2, and R3 are each independently a hydrogen, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, an oxygen, a sulfur, halogen, a carbonyl group, a S=O group, a O=S=O, a halogen, or any combination thereof.

In Reaction Scheme 1, R4 is a hydrogen, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, a substituted or unsubstituted C1-C20 alkoxy group, an OH group, a halogen, or any combination thereof.

Any monomeric benzoxazine compounds may be combined to form a crosslinked compound including benzoxazine, a polymeric compound including benzoxazine, or a resin including benzoxazine. To form a benzoxazine polymer or resin, the benzoxazine is polymerized. The polymerization may include heating to open the oxazine ring.

In some embodiments, the benzoxazine compound is crosslinked to form a thermosetting polybenzoxazine. The crosslinking occurs through a ring opening mechanism. Crosslinked polybenzoxazines are formed from benzoxazine monomers having more than one benzoxazine ring.

Polybenzoxazines are polymers that include benzoxazine compounds. Polybenzoxazines include benzoxazine compounds or monomers that are functionalized. The benzoxazine monomers may include one, two, three, or more functional groups or reactive sites that promote crosslinking.

In some embodiments, the benzoxazine compounds are bi-functional benzoxazine compounds. Bi-functional benzoxazine compounds may crosslink after heating to form crosslinked benzoxazine resins.

In one embodiment, bi-functional benzoxazine compounds have the following structure:

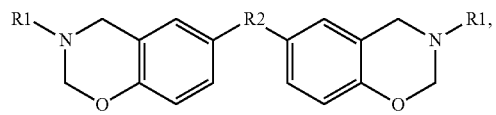

wherein R1 is a hydrogen, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, a substituted or unsubstituted C1-C20 alkoxy group, an OH group, a halogen, or any combination thereof; and R2 is a single bond, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, an oxygen, a sulfur, a carbonyl group, a S=O group, a O=S=O, or any combination thereof.

In one embodiment, the benzoxazine compound has the following structure:

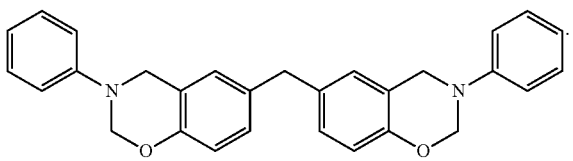 [SMILES: c1ccc(N2COc3ccc(Cc4ccc5c(c4)CN(c4ccccc4)CO5)cc3C2)cc1]

In some embodiments, a benzoxazine resin (2) is formed after heating a bi-functional benzoxazine (1) as shown in Reaction Scheme 2:

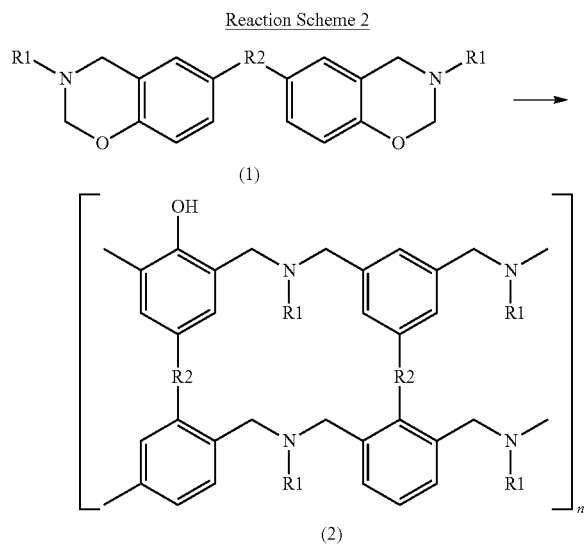

In Reaction Scheme 2, n is an integer from about 1 to about 2; R1 is a hydrogen, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, a substituted or unsubstituted C1-C20 alkoxy group, an OH group, a halogen, or any combination thereof; and R2 is a single bond, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, an oxygen, a sulfur, a carbonyl group, a S=O group, a O=S=O, or any combination thereof. In other embodiments, n is an integer greater than 2.

Non-limiting examples of benzoxazine resins include N-phenyl bisphenol A benzoxazine (commercially available as XU3560 from Huntsman Corporation, Salt Lake City, Utah); N-phenyl bisphenol F benzoxazine (commercially available as LBM6493 from Huntsman Corporation); N-phenyl phenolphtaleine benzoxazine (commercially available as LMB6490 from Huntsman Corporation); LOCTITE BZ 9110 AERO (Henkel Corporation, Dusseldorf, Germany), LOCTITE BZ 9120 AERO (Henkel Corporation), or any combination thereof.

In one embodiment, the benzoxazine composite material includes about 25 to about 45 weight % (wt. %) of the benzoxazine compound. In other embodiments, the benzoxazine composite material includes about 75 to about 99 wt. % of the benzoxazine compound. Yet, in other embodiments, the benzoxazine composite material includes about 35 to about 99 wt. % of the benzoxazine compound. Still yet, in other embodiments, the benzoxazine composite material includes an amount about or in any range from about 25, 30, 35, 40, 45, 50, 55, 60, 65, 70, 75, 80, 85, 90, and 95 wt. % of the benzoxazine compound The benzoxazine composite material of the benzoxazine composite material layer 102 includes reinforcing fibers. The reinforcing fibers may include carbon, silica, quartz, aramid, ceramic, or a combination thereof. The reinforcing fibers may include long fibers that have been pulled into alignment in substantially one direction. The reinforcing fibers may include portions of woven fabrics including continuous reinforcing fibers. The reinforcing fibers may include discontinuous short fibers. The reinforcing fibers may include portions of nonwoven fabrics.

A higher proportion of reinforcing fibers may be used in the benzoxazine composite, compared to phenolic composites. The higher proportion of reinforcing fibers means that the heat shield will have improved heat shield performance.

In some embodiments, the benzoxazine composite material includes about 45 to about 62 vol. % (vol. %) of the reinforcing fibers. In other embodiments, the benzoxazine composite material includes about 48 to about 60 vol. % of the reinforcing fibers. Yet, in other embodiments, the benzoxazine composite material includes about 45 to about 70 wt. % of the reinforcing fibers, depending on density. Still yet, in other embodiments, the benzoxazine composite material includes an amount about or in a range from about 45, 50, 55, 60, 65, and 70 wt. % of the reinforcing fibers, depending on density.

In some embodiments, the benzoxazine composite material includes a syntactic foam. The syntactic foam may be prepared from a resin. The syntactic foam may include, for example, glass, quartz micro balloons, quartz microspheres, or any combination thereof. The syntactic foam may be used to create a lightweight, insulative heat shield.

The benzoxazine composite material may include other polymers or compounds to form a blend. Non-limiting examples of other polymeric materials that may be included in the benzoxazine composite material include epoxy resins, cyanate esters, maleimides/bismaleimides, isocyanates, polyamides, phosphazenes, thermoplastics, acrylates, vinylmonomers, triazine compounds, anhydrides, or any combination thereof.

The benzoxazine composite material may be produced by a method that includes directly impregnating the reinforcing fibers with the benzoxazine compound (e.g., a benzoxazine resin). Non-limiting examples of methods for making the benzoxazine composite include hand lay-up methods, filament winding methods, pultrusion methods, resin injection molding methods, and resin transfer molding methods.

Figure 3:
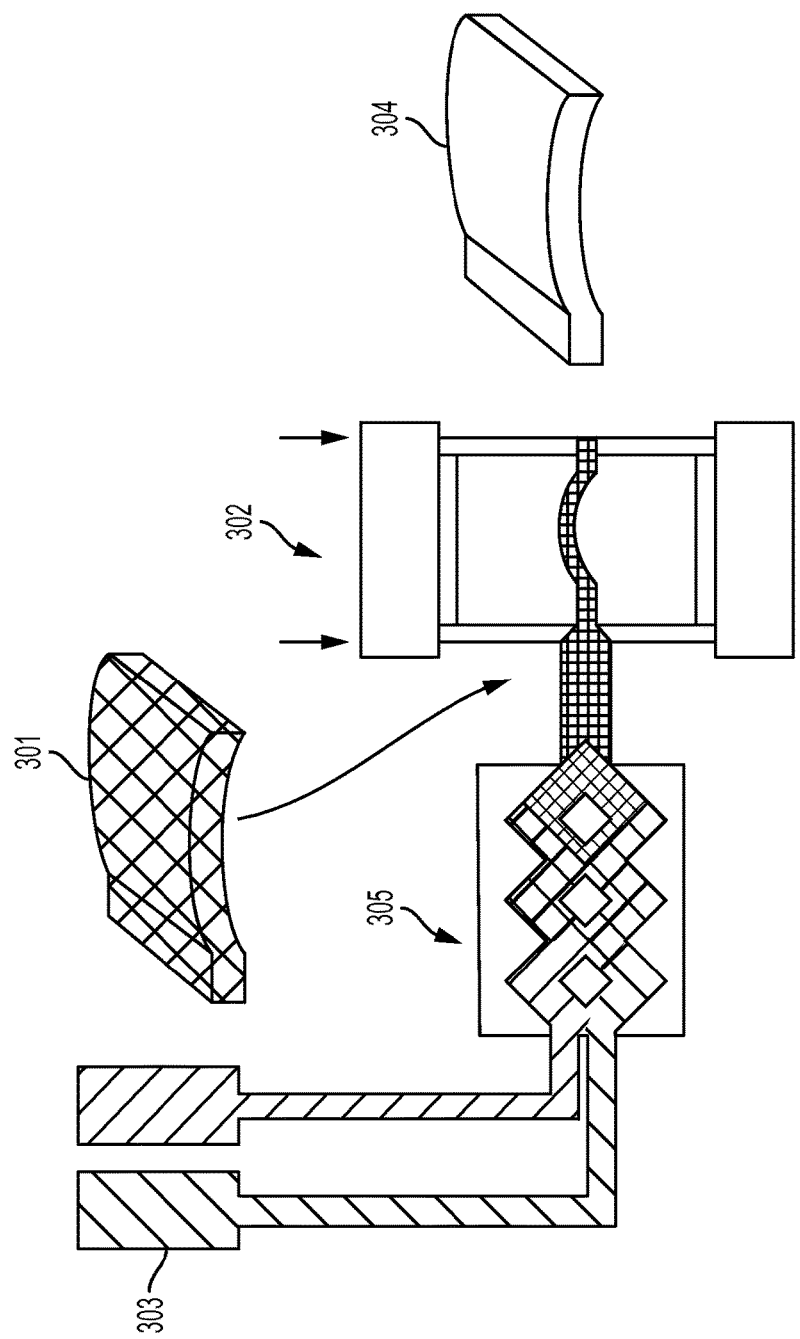
FIG. 3 is a method for making the benzoxazine composite material.

FIG. 3 illustrates a method of making the benzoxazine composite material using a resin transfer molding method according to exemplary embodiments. First, reinforcing fibers are dried into a preformed fiber structure 301. The preformed fiber structure 301 is disposed into a desired mold 302. A benzoxazine compound/resin 303 is prepped, mixed, and inserted into the mold 302 along with the preformed fiber structure 302. The insertion may take place using a standard extruder 305. The reinforcing fibers of the preformed fiber structure 301 and the benzoxazine compound/resin 303 are cured (not shown) to provide the final benzoxazine part 304. In an exemplary embodiment, the curing may be performed at a temperature in a range from about 180 to about 220° for about 2 to about 4 hours.

As described below, the benzoxazine part 304 may be a tile, sheet, or a part in any shape or size. The benzoxazine part 304 may a free-standing heat shield (see also, FIG. 2). The benzoxazine part 304 may be tiles that are combined and arranged over a substrate to form a heat shield (see also, FIG. 1B).

Referring again to FIG. 1A, the benzoxazine composite material layer 102 has a thickness that generally varies and is not intended to be limited. In some embodiments, the thickness of the benzoxazine composite material layer 102 is in a range from about 0.1 millimeter (mm) to about 150 mm. In other embodiments, the thickness of the benzoxazine composite material layer 102 is greater than 150 mm.

The benzoxazine composite material layer 102 is disposed onto a substrate 101. The substrate 101 may include any heat shield material. Non-limiting examples of suitable substrate 101 materials include metal(s), for example, titanium, steel, aluminum, nickel, or any combination thereof. The substrate 101 may include a metal or a metal alloy. Other non-limiting examples of suitable substrate 101 materials include ceramic composite materials. When used, the thickness of the substrate 101 generally varies and is not intended to be limited.

In addition to the benzoxazine composite material layer 102 and the substrate 101, the heat shield may include other layers. One or more layers of the benzoxazine composite material layer 102 may be disposed onto the substrate. Other layers may be inserted between the benzoxazine composite material layer 102 and the substrate 101. Layers also may be disposed directly onto the benzoxazine composite material layer 102.

Figure 1B:
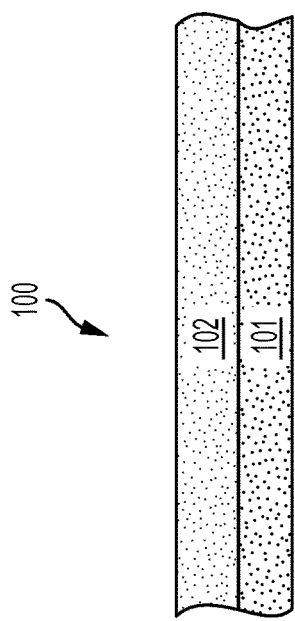
FIG. 1B is a cross-sectional side view of a portion of a heat shield including benzoxazine composite tiles arranged on a substrate.

FIG. 1B is a cross-sectional side view of a portion of a heat shield 101 including benzoxazine composite tiles 103 arranged on a substrate 101 according to various embodiments. Instead of a single continuous layer disposed over a substrate as shown in FIG. 1A, the benzoxazine composite material is formed into individual tiles that are arranged edge-to-edge over a substrate 101. The benzoxazine composite tiles 103 may have any shape or dimensions, which depend on the shape and size of the desired heat shield.

In an exemplary embodiment, the benzoxazine composite tiles 103 have a pentagon shape or a hexagon shape that fit together to reduce sharp edges.

Figure 2:
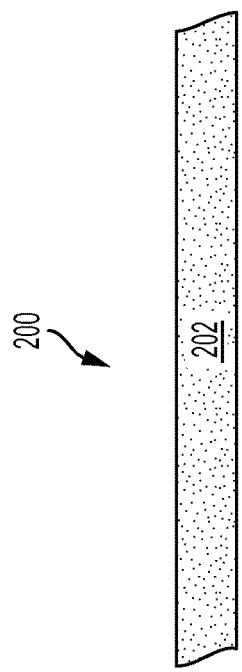
FIG. 2 is a cross-sectional side view of a portion of a heat shield including a free-standing benzoxazine composite material.

FIG. 2 is a cross-sectional side view of a portion of a heat shield 200 including a free-standing benzoxazine composite material 202 according to some embodiments. The heat shield does not include a substrate. The benzoxazine composite material 202 is formed/molded into the shape of the heat shield without any additional supporting layers.

The heat shields shown in FIGS. 1A, 1B, and 2 may have any shape, size, dimension, or combination of shapes, sizes, and dimensions. The heat shields may be in the shape of flat sheets. The heat shields may have a cone shape, a cube shape, a cylinder shape, a cuboid shape, a pyramid shape, a triangular prism shape, a triangular based pyramid shape, a spherical shape, or any combination thereof. The shape of the heat shield depends on the application and is not intended to be limited. The heat shields may have, for example, cylindrical sections, bullet or nosecap shaped sections, rectangular panel sections, and the like for attachment to generally flat or other shaped surfaces.

The benzoxazine composite materials provide a continuous surface of the heat shield. The benzoxazine composite material is an ablative continuous surface that can withstand, for example, severe re-entry environments. The benzoxazine composite material can withstand high pressures, for example, pressures greater than 0.2 atmospheres. The benzoxazine composite material can also withstand heating, for example, in a range from about 100 to about 1000 Watts/centimeter$^2$ (W/cm$^2$).

In some embodiments, the heat shields may be attached to a spacecraft, such as a sample return capsule, to provide thermal protection for the spacecraft during atmospheric re-entry. In other embodiments, the heat shields may be used as blast shields to protect from motor exhaust. Yet, in other embodiments, the heat shields may be used as firewalls in buildings and mobile transportation devices, for example, in aircrafts, spacecrafts, automobiles (e.g., race cars), submarines, and ships (e.g., navy vessels).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A heat shield, comprising:
  a substrate having a surface; and
  a plurality of tiles comprising a benzoxazine composite material disposed onto the surface of the substrate, the benzoxazine composite material consisting essentially of a thermosetting benzoxazine compound and a reinforcing fiber;
  wherein the heat shield forms at least part of a thermal protection system.

2. The heat shield of claim 1, wherein the substrate comprises titanium, steel, aluminum, nickel, a ceramic composite, or any combination thereof.

3. The heat shield of claim 1, wherein the reinforcing fiber comprises carbon, silica, quartz, aramid, or any combination thereof.

4. The heat shield of claim 1, wherein the benzoxazine composite material comprises a monomer comprising a benzoxazine compound, a polymer comprising a benzoxazine compound, a resin comprising a benzoxazine compound, a crosslinked compound comprising a benzoxazine compound, or any combination thereof.

5. The heat shield of claim 1, wherein the benzoxazine compound is a thermosetting resin.

6. The heat shield of claim 1, wherein the benzoxazine composite material has a thickness in a range from about 0.1 millimeters (mm) to about 150 mm.

7. The heat shield of claim 1, wherein the heat shield is a firewall.

8. A method of making a heat shield, the method comprising:
   combining a reinforcing fiber and a thermosetting benzoxazine compound in a mold to form a benzoxazine composite material consisting essentially of the thermosetting benzoxazine compound and the reinforcing fiber; and
   curing the benzoxazine composite material to form a molded heat shield; or curing the benzoxazine composite material to form a heat shield layer and disposing the heat shield layer onto a substrate;
   wherein the heat shield forms at least part of a thermal protection system.

9. The method of claim 8, wherein the heat shield layer is a continuous layer disposed over the substrate.

10. The method of claim 8, wherein the heat shield layer is a tile, and the method further comprises arranging tiles edge-to-edge on the substrate.

11. The method of claim 8, wherein the benzoxazine resin comprises a crosslinked benzoxazine.

12. The method of claim 8, wherein the benzoxazine resin has the following structure:

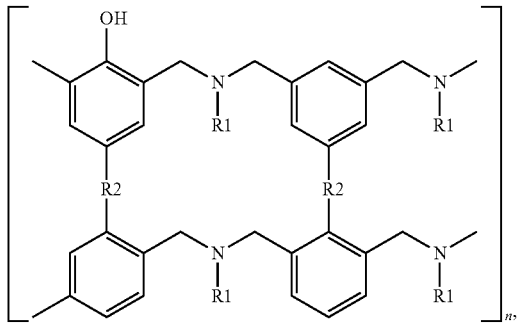

wherein n is an integer from about 1 to about 2; R1 is a hydrogen, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, a substituted or unsubstituted C1-C20 alkoxy group, an OH group, a halogen, or any combination thereof; and R2 is a single bond, a substituted or unsubstituted C1-C20 alkyl group, a substituted or unsubstituted C2-C20 alkenyl group, a substituted or unsubstituted C6-C20 aryl group, a substituted or unsubstituted C2-C20 heteroaryl group, a substituted or unsubstituted C4-C20 carbocyclic group, a substituted or unsubstituted C2-C20 heterocyclic group, a C3-C8 cycloalkyl group, a substituted or unsubstituted C1-C20 alkylene group, a substituted or unsubstituted C6-C20 arylene group, a substituted or unsubstituted C2-C20 heteroarylene group, an oxygen, a sulfur, halogen, a carbonyl group, a S=O group, a O=S=O, or a combination thereof.

13. The method of claim 8, wherein the heat shield is an ablative heat shield.

14. The heat shield of claim 1, wherein the benzoxazine composite material has a thickness that is greater than 150 millimeters (mm).

* * * * *